United States Patent [19]

Haas

[11] Patent Number: 4,798,647

[45] Date of Patent: Jan. 17, 1989

[54] RELEASABLE MOUNTING ASSEMBLY FOR TIRE BUILDING DRUM

[76] Inventor: Herbert G. Haas, 1650 Perry Dr., Canton, Ohio 44708

[21] Appl. No.: 148,292

[22] Filed: Jan. 25, 1988

[51] Int. Cl.$^4$ .............................................. B29D 30/24
[52] U.S. Cl. .................. 156/414; 192/93 C; 192/96
[58] Field of Search .................. 156/414; 425/46, 47; 192/93 C, 96

[56] References Cited

U.S. PATENT DOCUMENTS 4,214,941 7/1980 Horr et al. ............................ 156/414

Primary Examiner—Jay H. Woo
Assistant Examiner—Timothy W. Heitbrink
Attorney, Agent, or Firm—Reese Taylor

[57] ABSTRACT

A quick release mounting assembly for a tire building drum includes a tapered plug and a chuck, both of which are securable to the hub of the drum. The assembly also includes a tapered rod receivable within the normal push rod of the tire building machine and ball locks movable by the tapered rod into and out of locking engagement with the push rod and chuck. The assembly also includes a flanged sleeve, telescoped over the push rod and movable into and out of axial locking engagement with the tapered plug to urge the drum axially either into or out of engagement with the tire building machine.

18 Claims, 3 Drawing Sheets

RELEASABLE MOUNTING ASSEMBLY FOR TIRE BUILDING DRUM

BACKGROUND OF THE INVENTION

This invention relates, in general, to tire building machines and relates, in particular, to improvements in the mounting of collapsible tire building drums.

DESCRIPTION OF THE PRIOR ART

It is conventional in the manufacture of pneumatic tires to employ a collapsible building drum which is rotatably mounted on a tire building machine and about which one or more plies are wrapped in cylindrical form. These plies are built up on the drums with their ends extending over opposed ends of the drums and beads are set on such axially extending ends of the plies, following which the plies are turned up and stitched down so as to form the green or raw tire. The belt and tread may then be applied, following which the tire may be cured.

Needless to say, the building drums are of varying sizes so that, depending upon the particular tire being built on the particular tire building machine at a given time, the drums must be removed and replaced from time to time.

Heretofore, this has been a relatively difficult and time-consuming operation, primarily because of the fact that the building drums are constructed with a flanged hub on the end which is mounted on the main drive shaft at the feed end of the tire building machine and secured thereto by screws which are very difficult to obtain access to.

In addition to the inconvenience caused by the access problem, it takes quite a bit of time to change one of these drums and it is, accordingly, an object of the present invention to provide a quick release assembly which can be used with any existing building drum of this general type and which will permit secure mounting for operational purposes but which will make it possible to very quickly mount and dismount the drum when it is necessary to make a change.

SUMMARY OF THE INVENTION

In furtherance of that object, it has been found that a unique adaptor assembly can be provided for attachment to the conventional hub of a tire building drum whereby the drum may be quickly and conveniently attached to and removed from the drum driving shaft of the tire building machine without the use of any tools.

To that end, it has been found that a tapered plug and specially designed chuck can be attached to the normal mounting hub on the conventional drum so that a modified push rod assembly of the type conventionally used with collapsible drums can be utilized to engage or disengage the plug and chuck so as to permit the drum to simply be lifted off without the necessity for the loosening or tightening of any screws, bolts or nuts whatsoever.

It has specifically been found that a tapered rod can be provided within the push rod for reciprocal movement therewith and that the push rod itself can be bored for reception of a plurality of balls so that, by axially moving the tapered rod so that the tapered end moves into and out of registry with the bores in the push rod, the balls can be moved into and out of locking engagement with the chuck.

It has also been specifically found that, by providing a sleeve which telescopes over the push rod with a radially outwardly extending flange and the tapered plug with an internal groove, axial movement of the sleeve will move the plug and drum axially a sufficient distance to, on the one hand, prevent axial separation and, on the other hand, permit drum removal.

It is, accordingly, the principal object of the present invention to provide a quick release mounting assembly for tire building drums of the character above-described with other objects thereof becoming more apparent upon a reading of the following brief specification considered and interpreted in view of the accompanying drawings.

BRIEF DESCRIPTION OF THE PREFERRED EMBODIMENTS

It will be noted, as already mentioned, that the conventional building drum referred to herein normally has a mounting hub secured thereto and projecting axially therefrom for engagement with the main drive shaft of the overall tire building machine. The purpose of this attachment is, of course, first, to support the drum on the drive shaft and, second, to make it possible to rotate the drum as the plies are applied thereto.

This arrangement also normally includes a push rod which engages the drum and is movable axially to expand or collapse the drum. Details of the collapsing mechanism have not been illustrated in detail herein since such structure is well-known to those skilled in this art.

Figure 1:
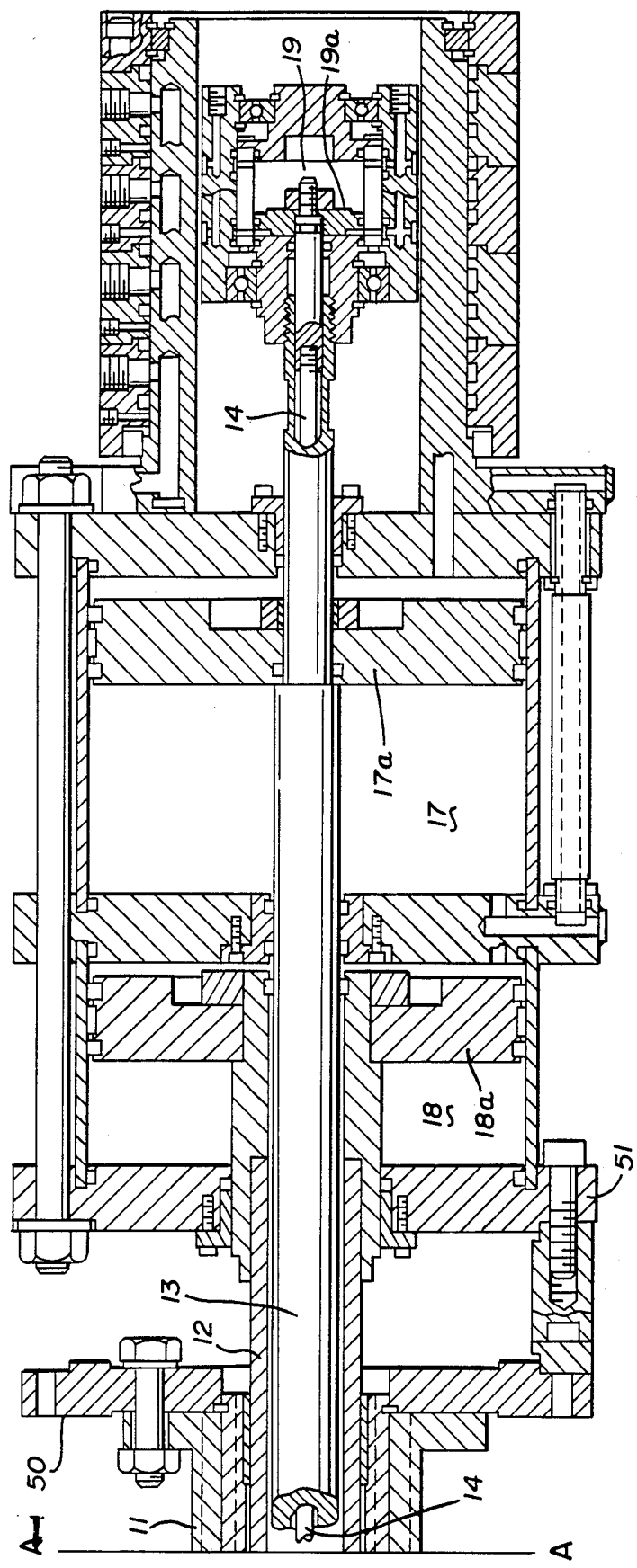
FIGS. 1 and 2 are an elevational view, partially in section, of the improved mounting assembly in the locked position utilizing match lines A—A.
Figure 2:
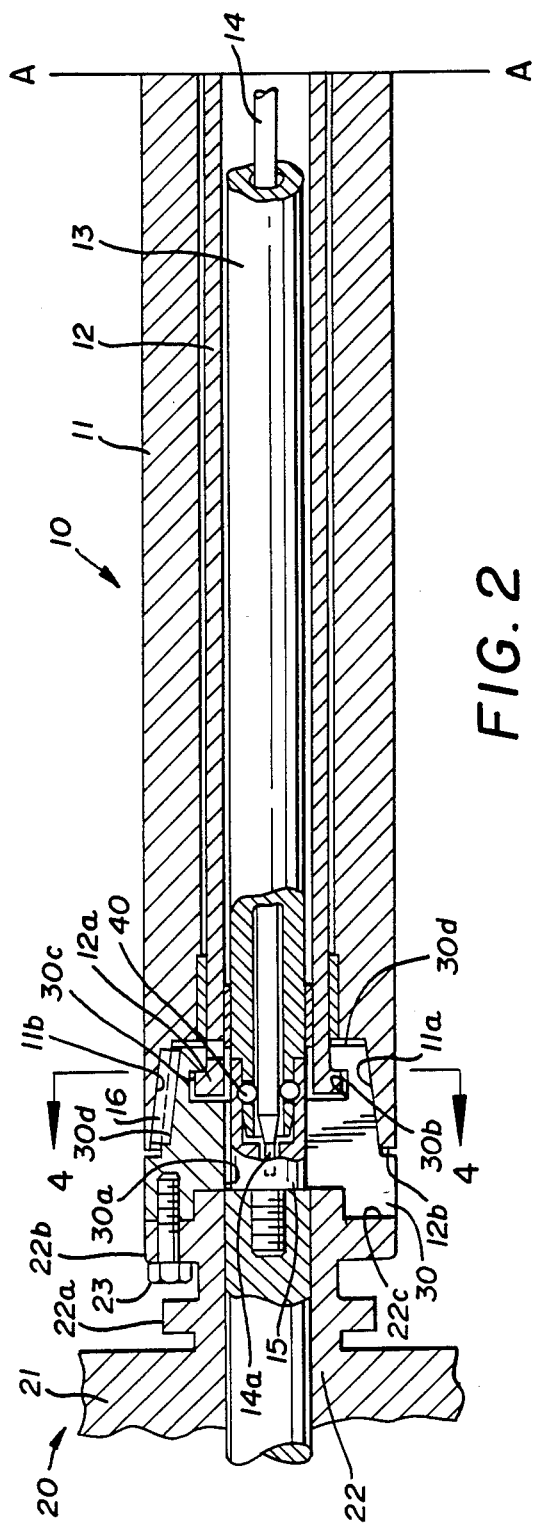

Referring then to FIGS. 1 and 2 of the drawings, it will be noted that the mounting assembly and drive means are generally indicated by the numeral 10 and include, in general terms, the elongate, hollow housing 11 of the main drive shaft, an elongate sleeve 12 received interiorly of the housing, and a push rod 13 and tapered rod 14 received still further radially inwardly of the housing 11 and sleeve 12, with all of these components being generally arranged in concentric, telescoped relationship with each other.

As previously noted, the shaft housing 11 is utilized to impart rotary motion to the drum during the tire building process, while the push rod 13 is utilized to expand the drum so that the tire can be built up on its surface and collapse it for tire removal. As also previously noted, the detailed structure for these operations will not be discussed herein.

The tire building drum, generally indicated by the numeral 20 and only partially illustrated, has the aforementioned hub 21 projecting axially therefrom. This hub includes an axially extending neck 22 which has a first radial flange 22a and a second radial flange 22b. One face of the second flange 22b, at its projecting end, forms a shoulder 22c for cooperation with the tapered plug of the invention, as will be described.

In that regard, the tapered plug 30 is shown as being securable to the flange 22b of the hub neck 22 by one or more screws 23. It will be understood that the flange 22b of standard hub 21 is normally bored for reception of one or more screws 23 so that no modification of the standard hub is required. It will be understood also that the drum 20 is merely representative of the general type of tire building drum to which the invention relates and hub 21 may, in some instances, have a different design than that illustrated in the drawings.

The tapered plug 30 also has a through central bore 30a and the outer wall of the projecting end of the plug 30 is tapered for cooperation with the housing 11, as will be described below. It will also be noted that the bore 30a has an annular internal groove 30b cut therein and an external keyway 30d for purposes which will be described.

At this point, suffice it to say that the invention contemplates that the plug 30 will remain affixed to the hub 20. In other words, once these two components are secured together by one or more screws 23, they will remain together as the drum is removed for storage and it will not be necessary to again remove, tighten or loosen the screws 23.

Turning again, then, to FIGS. 1, 2 and 3 for a description of the elongate housing 11 of the main drive shaft, it will be seen that, at one end, the housing is secured to plates 50 and 51 so that it can rotate with the drum 20 and the drive assembly (not shown). It should be noted that the overall tire building machine has not been fully illustrated, but it will be understood that cylinders 17, 18 and 19 will be carried thereby and will be rotatable in conventional fashion. Therefore, plates 50 and 51 represent only a portion of the overall machine, but sufficient structure to fully explain the invention to one skilled in the art. It will be appreciated, however, that rotary motion imparted to plates 50 and 51 will be transmitted to drum 20 by housing 11 so that the drum may be rotated during the tire building operation.

Figure 3:
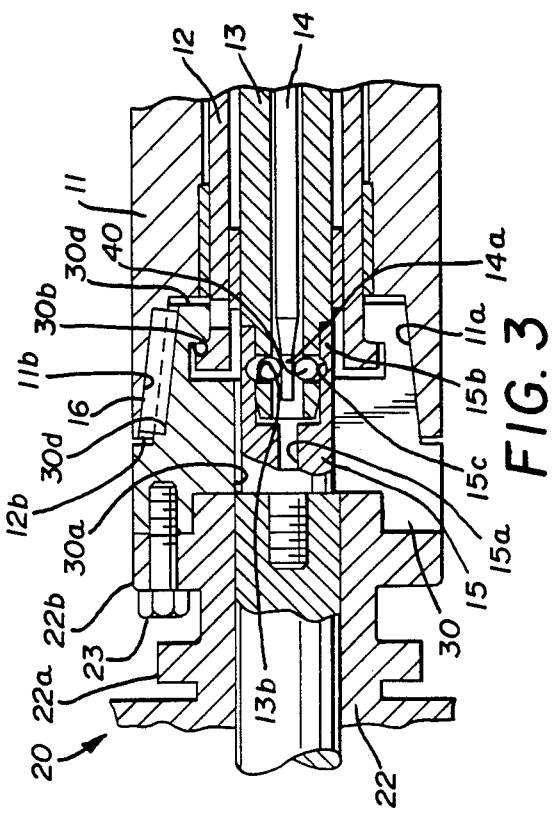
FIG. 3 is an elevational view, partially in section, showing the mounting assembly in a partially unlocked position with the balls out of engagement with the push rod.

The opposed end of the housing 11 has a tapered, internal counterbored configuration, as indicated at 11a, with the taper being complemental to the exterior taper on the plug 30 and forming a pocket for reception of the plug, as can clearly be seen in FIGS. 2 and 3 of the drawings.

A key 16 engages keyways 30d of plug 30 and 11b of housing 11 and serves to lock the housing 11 and plug 30 together so that rotation of the housing 11 will impart rotary movement to the plug 30 and thus to the hub 21 and the drum 20, as just mentioned.

As previously noted, received radially interiorly of the elongate housing 11 is an elongate, hollow sleeve 12 which serves as one of the principal locking members of this invention. A first end of that sleeve 12 is affixed to the piston 18a of first double acting cylinder 18 and the second end thereof is engagable with the plug 30.

In that regard, the second end of the sleeve 12 has a radially projecting annular flange 12a. As has been noted and as can be seen from FIGS. 2 and 3 of the drawings, the annular groove 30b disposed adjacent the projecting end of plug 30 is dimensioned so as to receive the flange 12a of sleeve 12. It will be noted that groove 30b is axially wider than flange 12a and, in the locked condition of FIG. 2, the flange 12a is in contact with the axially outermost wall of groove 30b so as to pull the plug 30 into locked position with respect to housing 11 due to retraction of piston 18a.

Still further radially interiorly of the housing 11 and sleeve 12 is the usual push rod 13 which is secured to the piston 17a of the second double acting cylinder 17 adjacent its first end so that it may move axially toward and away from the drum 20. The second end of the push rod 13 has an offset, reduced diameter area 13a which has one or more through radial bores 13b therein for reception of balls 40, as will be explained below.

Still referring to FIGS. 1, 2 and 3, radially inwardly of the push rod 13 is a tapered rod 14. A first end of this rod 14 is secured piston 19a of third double acting cylinder 19 so that rod 14 may be moved axially relatively of push rod 13.

Push rod 13 and rod 14, it should be noted, normally are moved together by piston 17a to expand and collapse drum 20. It will be noted that the first end of push rod 13 is threaded to the housing of cylinder 19 for this purpose. No detail of the drum structure, except for the hub 22, has been shown or described herein, but it will be noted that, for the purposes of the present invention, selective independent movement of rod 14 is required, as will be explained more fully below.

As noted, the first end of the rod 14 is secured to piston 19a of the third double acting cylinder 19. As can clearly be seen in FIGS. 2 and 3 of the drawings, the opposed or second end of the rod 14 is tapered and terminates in a diameter area as indicated by the numeral 14a.

Finally, a chuck 15 is received in bore 30a of plug 30 and is threaded into the drum shaft which is received in the hub 21 of drum 20. This chuck has a through central bore 15a and a projecting end 15b with an internal annular groove or seat 15c.

In use or operation of the improved quick release assembly, it will be assumed that the tapered plug 30 has been secured to the hub 22 by one of more screws 23 and that the chuck 15 has also been secured to the drum shaft, as can be seen in FIGS. 1 and 2, and the drum has been mounted and locked on housing 11.

As can be seen particularly in FIG. 2 of the drawings, for example, a plurality of balls 40 are normally received, in the locking condition, in the annular groove 15c of the plug 15, projecting through apertures 13b of the rod 13 and engaging the periphery of the rod 14. In this condition, the parts are locked together and the drum is securely mounted with respect to housing 11.

At this time, pistons 17a, 18a and 19a are in the positions illustrated in FIGS. 1 and 2 of the drawings so that sleeve 12 and push rod 13 are in their retracted positions and tapered rod 14 is in its extended position.

Thus, at this time, piston 18a is moved to the right of FIG. 1, thereby pulling sleeve 12 to the right of FIG. 2 and the flange 12a into engagement with the radially outermost wall 30c of groove 30b to lock the plug 30. Piston 19a will have moved to the left of FIG. 1 to register the full diameter portion of rod 12 with bores 13b and thus to force the balls into engagement with the groove 15c of chuck 15. Finally, piston 17 will have moved to the right of FIG. 1 so that push rod 13 has bores 13b in registry with groove 15c.

Assuming that the improved assembly has been assembled to the configuration of FIG. 2 of the drawings, it will be immediately noted that this is the fully assembled and locked position. In this condition, the tire building drum 20 is firmly mounted and is in position and condition to perform the tire building operation. It will be noted, as just mentioned, that the balls 40 are firmly seated in the annular groove 15b of the projecting end 15b of the chuck 15 and project through the holes 13b in the rod 13 to engage rod 14. Thus, rotational movement of housing 11 would be transmitted to the drum 20.

At this time, the tire building operation can be accomplished by rotating drum 20, applying the tire plies, setting the beads, etc., in conventional fashion. The drum may then be collapsed by moving piston 17a toward the drum, enabling push rod 13 to activate the drum mechanism so as to enable the tire to be removed. As can be seen, normal operation is thus accomplished without hinderance.

When it is desired to change the drum 20, it is first necessary to activate the third double acting cylinder 19 moving piston 19a to the right of FIG. 1 to retract the rod 14 to the right of FIG. 2 of the drawings, moving it to the FIG. 3 position. At this time, of course, the full diameter portion of the rod 14 will be moved out from beneath the balls 40, and the reduced diameter portions 14a will be beneath the balls 40. This permits the balls 40 to drop on through apertures 13b to the position shown in FIG. 3 or out of engagement with the groove 15b of the chuck 15. At this point, the chuck 15 is no longer locked to push rod 13.

Figure 5:
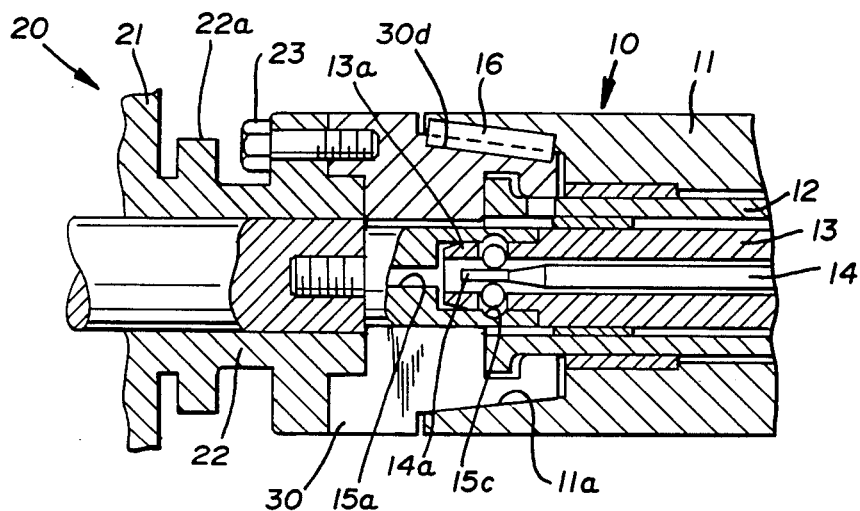
FIG. 5 is an elevational view, partially in section, showing the push rod moved axially just prior to movement of the plug.

The next step is to activate first double acting cylinder 18 moving piston 18a to the left of FIG. 2 or to the position of FIG. 5 of the drawings wherein flange 12a of sleeve 12 now abuts the axially innermost wall of groove 30b.

Figure 6:
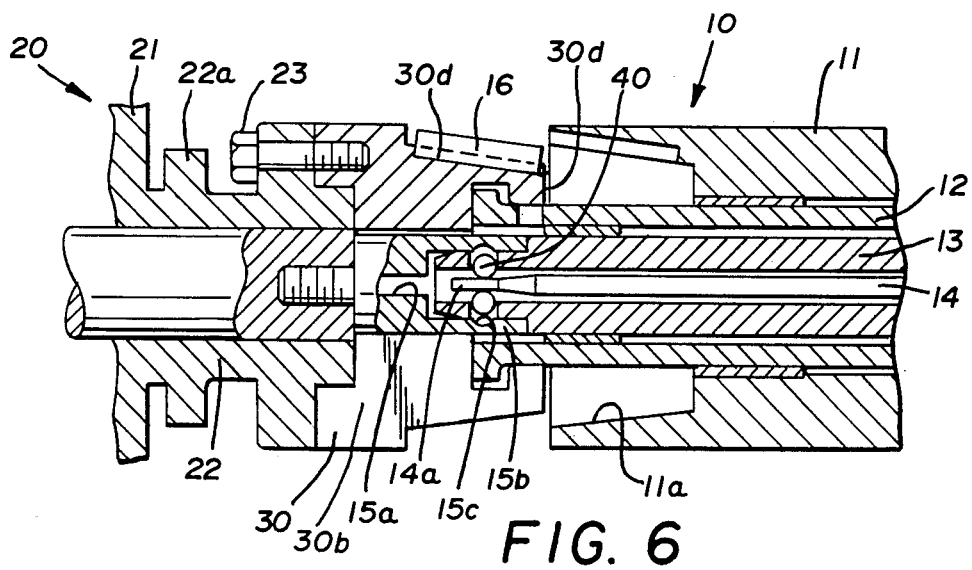
FIG. 6 is an elevational view, partially in section, showing the drum ready for removal from the housing.

To remove the drum 20, it is then merely necessary to continue to actuate the hydraulic cylinder 18 which extends the sleeve 12 further to the left of FIG. 2 of the drawings to the FIG. 6 position. The flange 12a of the sleeve 12 being against the radially innermost wall of the groove 30b of the tapered plug 30, such movement will push the plug 30 to the left, as shown in FIG. 6 of the drawings so that end 30e of the plug clears end 12b of the housing 12 with key 16 being clear of keyway 11b.

At this point, it is simply necessary to lift the drum 20 vertically away from the tire building machine and replace it with another.

Figure 4:
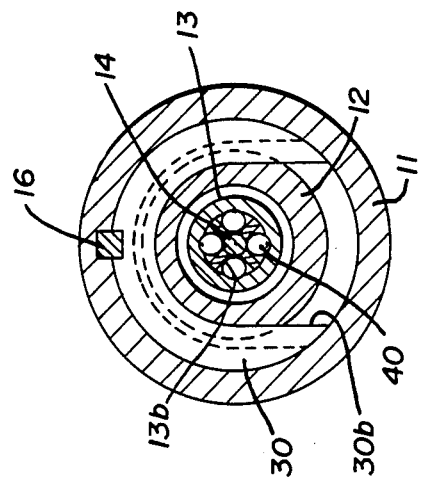
FIG. 4 is a sectional view taken along the line 4—4 of FIG. 2.
Figure 7:
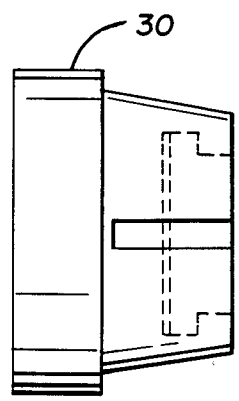
FIG. 7 is an elevational view of the tapered plug.

It should be noted at this point that the groove 30b of the tapered plug 30, as can be seen in FIGS. 4 and 7 of the drawings, does not extend fully around the sleeve 12 which is open at the bottom. Once the axial movement of push rod 13 and plug 15 just described has taken place, the plug 30 will thus be free to clear the push rod.

The next drum 20, which will have secured to it a chuck 15 and plug 30, can be then dropped into place, following which the operations just described can be reversed. In other words, the sleeve 12 will be retracted to the right of FIG. 3 of the drawings by piston 17a to pull the tapered plug 30 and the entire assembly back into the tapered cavity 11a of the housing 11. Following this, axial movement of the rod 14 toward the drum 20 by piston 19a will force the balls 40 back up into the bores 13a and into the annular groove 15a of the chuck 15, and the new drum will be locked into place and ready for operation.

While a full and complete description of the invention has been set forth in accordance with the dictates of the Patent Statutes, it should be understood that modifications can be resorted to without departing from the spirit hereof or the scope of the appended claims.

What is claimed is:

1. A mounting assembly for a tire building drum, said drum having a mounting hub on at least one axial end for attachment to a drum driving shaft of a tire building machine, said assembly comprising:
   (a) a tapered plug attachable to a projecting end of the mounting hub;
   (b) a chuck secured to the hub and disposed interiorly of said tapered plug; and
   (c) attachment means for releasably interconnecting said chuck to the drum driving shaft.

2. The mounting assembly of claim 1 wherein said hub is connected to the drum driving shaft for rotational movement therewith.

3. The mounting assembly of claim 1 wherein the drum driving shaft has a tapered cavity opening into one end thereof; and said tapered plug has a complementally tapered outer configuration.

4. The mounting assembly of claim 3 wherein said chuck has an annular internal groove on its projecting end; and said attachment means include engagement means releasably received in said groove.

5. The mounting assembly of claim 4 wherein said engagement means include at least two balls movable into and out of engagement with said annular internal groove of said chuck.

6. The mounting assembly of claim 5 wherein an axially movable tapered rod is received in telescoping relationship with the drum driving shaft; said tapered rod engaging said balls upon axial movement toward the drum to force said balls into said annular internal groove of said chuck.

7. The mounting assembly of claim 5 wherein a push rod is received in telescoping relationship with the drum driving shaft; an axially movable tapered rod is received in telescoping relationship with said push rod; said push rod having at least two radial bores in one end thereof; said tapered rod engaging said balls upon axial movement toward the drum to force said balls into said annular internal groove of said chuck through said radial bores of said push rod.

8. The mounting assembly of claim 1 wherein said attachment means include an axially movable sleeve, telescopically received within the drum driving shaft housing and is movable into and out of locking engagement with said tapered plug.

9. The mounting assembly of claim 8 wherein said tapered plug has an internal annular groove; and said sleeve has a radially extending flange receivable in said groove.

10. The mounting assembly of claim 9 wherein said internal annular groove of said tapered plug has an axial dimension greater than the axial dimension of said radially extending flange of said sleeve.

11. A mounting assembly for a tire building drum, said drum having a mounting hub on at least one axial end for attachment to a driving shaft of a tire building machine, said assembly comprising:
   (a) a tapered plug attachable to a projecting end of the mounting hub;
   (b) first locking means carried by the drum driving shaft and releasably engagable with said tapered plug for preventing axial separation of the drum and the drum driving shaft;

(c) second locking means carried by the drum driving shaft and said plug for attaching said plug to said shaft for rotational movement therewith;

(d) a chuck received interiorly of said tapered plug and secured to the hub; and (e) third locking means carried by the drum driving shaft and said chuck for preventing axial separation therebetween.

12. The mounting assembly of claim 11 wherein said first locking means include a sleeve telescopically received within said drum driving shaft and movable axially toward and away from the drum.

13. The mounting assembly of claim 12 wherein said tapered plug has an internal annular groove; and said sleeve has a radial flange receivable within said groove.

14. The mounting assembly of claim 13 wherein said groove has an axial width dimension greater than the axial width dimension of said flange whereby axial movement of said sleeve toward the tire building machine will pull said tapered plug toward the tire building machine and axial movement of said sleeve away from the tire building machine will urge said tapered plug away therefrom.

15. The mounting assembly of claim 11 wherein said second locking means includes an internal keyway in the drum driving shaft; an external keyway in said tapered plug; and a key interconnecting said keyways.

16. The mounting assembly of claim 11 wherein said chuck has an internal annular groove; said third locking means includes an axially movable rod telescopically received within the drum driving shaft; and at least two balls selectively movable into and out of engagement with said internal annular groove upon axial movement of said rod toward and away from said chuck.

17. The mounting assembly of claim 16 wherein said rod has a reduced diameter tapered end disposed adjacent said chuck.

18. The mounting assembly of claim 16 wherein a push rod is telescopically received within the drum driving shaft and about said axially movable rod; said push rod having at least two radial bores of a size larger than said balls; said balls being in engagement with said annular groove in said chuck through said bores when said rod is extended toward said chuck.

* * * * *

UNITED STATES PATENT AND TRADEMARK OFFICE
CERTIFICATE OF CORRECTION

PATENT NO. : 4,798,647
DATED : January 17, 1989
INVENTOR(S) : Haas

It is certified that error appears in the above-identified patent and that said Letters Patent is hereby corrected as shown below:

In Column 4, Line 31, between the words "a" and "diameter", insert the word --reduced--.

In Column 6, Line 61, between the first "a" and the word "driving", insert the word --drum--.

Signed and Sealed this

Eleventh Day of July, 1989

Attest:

DONALD J. QUIGG

Attesting Officer    Commissioner of Patents and Trademarks